United States Patent
Cha et al.

(10) Patent No.: US 9,100,474 B2
(45) Date of Patent: Aug. 4, 2015

(54) SYSTEM AND METHOD FOR PROVIDING WIRELESS CAPTIONED TELEPHONE SERVICE

(75) Inventors: Wonjae Cha, Yongin (KR); Jinseok Eom, Seoul (KR)

(73) Assignee: Miracom USA, Inc., Brea, CA (US)

( * ) Notice: Subject to any disclaimer, the term of this patent is extended or adjusted under 35 U.S.C. 154(b) by 876 days.

(21) Appl. No.: 13/294,136

(22) Filed: Nov. 10, 2011

(65) Prior Publication Data

US 2013/0058270 A1 Mar. 7, 2013

(30) Foreign Application Priority Data

Sep. 1, 2011 (KR) .................... 10-2011-0088607

(51) Int. Cl.
*H04L 12/28* (2006.01)
*H04M 3/42* (2006.01)
*H04J 1/16* (2006.01)
*H04M 7/00* (2006.01)

(52) U.S. Cl.
CPC .......... *H04M 3/42391* (2013.01); *H04M 7/006* (2013.01); *H04M 2207/18* (2013.01)

(58) Field of Classification Search
USPC .......................... 370/252, 329, 352, 401, 386
See application file for complete search history.

(56) References Cited

U.S. PATENT DOCUMENTS

| | | | |
|---|---|---|---|
| 6,914,964 B1 * | 7/2005 | Levine | 379/52 |
| 2012/0036274 A9 * | 2/2012 | Skog et al. | 709/228 |
| 2012/0329518 A1 * | 12/2012 | Garg | 455/556.1 |
| 2013/0188784 A1 * | 7/2013 | Engelke et al. | 379/52 |
| 2013/0244705 A1 * | 9/2013 | Gould et al. | 455/466 |

* cited by examiner

*Primary Examiner* — John Pezzlo
(74) *Attorney, Agent, or Firm* — Chanmin Park

(57) ABSTRACT

This invention is about WCTS Server System, WCTS Terminal and Method to provide Caption Telephone Service. By using voice in wireless and data network, WCTS Sever System provides Wireless Captioned Telephone Service, WCTS), which is one of Telecommunication Relay Service Types. This invention provides convenience by providing the same method of non-handicapped person with WCTS terminal when a deaf person who can speak is speaking on the phone with non-handicapped person. On the other hand, this invention also provides the method of direct dialing to a deaf person who can speak, not the method of indirect dialing that uses representative number of relay center.

30 Claims, 10 Drawing Sheets

SYSTEM AND METHOD FOR PROVIDING WIRELESS CAPTIONED TELEPHONE SERVICE

FIELD OF TECHNOLOGY

The present invention is about system, terminal and service providing method that provide Wireless Captioning Telephone Service (WCTS in below), which is one type of Telecommunication Relay Services (TRS in below), by using Circuit-eased voice service of a mobile communication network. When a deaf person who can speak talks over the telephone with a normal person, this invention enhances the convenience by providing the same way of operating mobile terminal as a normal person, and protects the privacy of a deaf person about his disability from a normal person by providing the way for a non-handicapped person to call directly to a deaf person who can speak, not indirect way of calling a handicapped person by using representative number of relay center. Also when the handicapped with hearing disability receives the WCTS incoming call service, by using the circuit-eased voice service of mobile communication network, this invention makes the success rate of receiving incoming call same level as the non-handicapped.

THE BACKGROUND TECHNOLOGY OF INVENTION

Among the currently provided TRS, WCTS is one type of developed CTS (Captioning Telephone Service). WCTS is a relay service that transfers voice traffic of the other user together with caption traffic literated at a relay center to the handicapped and transfers voice traffic of the deaf person who can speak to the other user as it is. Said relay service transfers voice data through existing wire or wireless voice communication network and conveys captioned data through data network. Also said relay service, regarding the way for a deaf person who can speak to call, executes special application program at a device connected to internet, enters the calling number and the handicapped person's own number, and then transfers the numbers to the relay center. After this process, said relay center calls a relay agent, person called and a deaf caller who can speak and forms the voice communication path. For that reason, there is serious inconvenience that the deaf caller who can speak should receive the call from the relay center even though he is the caller himself.

And, regarding the way for a non-handicapped person to call the dead person who can speak, the non-handicapped person cannot directly press the number of the handicapped person. He should call the relay center and wait for ARS or relay agent to answer. After ARS or relay agent answers, the non-handicapped person must enter the number of handicapped by using DTMF (Dual Tone Multiple Frequency) or directly dictate the number. For this reason, the process is very complicated and inconvenient. Also there is burden on the side of handicapped person to expose his handicap because he should give the number of relay center when he gives out his telephone number.

Regarding the mobile terminal of the deaf person who can speak, due to the advancement in mobile communication technology, the mobile terminal can use CTS by executing mobile VoIP (mVoIP) based program in the smart phone. However, for the management of the mobility of terminal, frequent communication with mobile communication packet network is required, which causes the battery consumption problem. Upon reception and transmission of call, special program user interface is required. This makes impossible the use of distinctive smart phone service, which is dialer function. The loss of receipt call on account of absence of function of paging in the mobile communication packet network is another problem.

PRIOR ART MATERIAL

Patent Literature

Laid-open patent application, Republic of Korea 10-2010-0050959, Communication system for deaf person Problem to be Solved by this Invention This invention was designed to solve above mentioned problems. The purpose of this invention is to provide function enabling a deaf person who can speak to directly call another person with numbers saved in his mobile terminal by providing the same way of non-handicapped person's phone use, and to provide WCTS terminal device with function to identify the number of caller upon the receipt of call and then allow the person to talk.

The purpose of this invention is also to provide function to directly dial to both a deaf person who can speak and a person with no disability, to transfer voice of the non-handicapped person to relay center, and to provide WCTS server system with function of mutual voice data exchange.

The purpose of this invention is also to enable a non-handicapped person to directly dial the number of a deaf person who can speak without using representative number of relay center, and as a result to provide caption telephone service that helps a handicapped person to avoid exposure of his handicap to another person with no handicaps.

The purpose of this invention is also in the aspect of control of WSTS terminal device to provide credibility in the receipt of incoming call and to minimize the consumption of power by leaving out the control of mobility of mobile terminal.

Means to Solve Problem

For the above mentioned problem solving, according the first aspect of this invention, Wireless Captioned Telephone Service (WCTS) Interface Terminal that sets up First Voice Traffic Path and First Caption Traffic Path connecting WCTS terminal device; Network Interface that sets up Second Voice Traffic Path connecting the other user's terminal; Relay Center Interface that sets up Third Voice Traffic Path and Second Caption Traffic Path connecting Relay Center; Handler Part that handles at least one of said First Voice Traffic Path, said First Caption Traffic Path, said Second Voice Traffic Path, Third Voice Traffic Path and said Second Caption Traffic Path; and WCTS server system that by controlling said WCTS terminal interface, above mentioned network interface, said relay center interface and said handler part, from said the other user's terminal, receives voice data through said Second Voice Traffic Path, transfers said voice data to above mentioned relay center through Third Voice Traffic Path, receives caption data generated from said voice data through said Second caption traffic path, and transfers said voice data through First Voice Traffic Path and said caption data through First Caption Traffic Path to said WCTS terminal—can be provided.

Said First Voice Traffic Path is established by using voice communication network and mobile communication circuit network, said First Voice Traffic Path is established by using Internet protocol data network and said mobile communication packet network, said First Voice Traffic Path and said First Caption Traffic Path are separated, said Second Voice Traffic Path and said Third Voice Traffic Path are established by using voice communication network, said Caption Traffic Path is established by using Internet protocol data network—they are desirable distinction of WCTS server system.

Said First Voice Traffic Path and said First Caption Data are established by using Internet protocol data network and mobile communication packet network, said First Voice Traffic Path and said Caption Traffic Path are same, said Second Voice Traffic Path and said Third Voice Traffic Path are established by using voice communication network, said Second Caption Traffic Path is established by using Internet protocol data server system—they are desirable distinction of WCTS server system.

Said First Voice Traffic Path is established by using voice communication network and mobile communication circuit network, said First Caption Traffic Path is established by using Internet protocol data network and said mobile communication circuit network, said Voice Traffic Path and said Third Voice Traffic Path are established by using said voice communication network, said Second Caption Traffic Path is established by using Internet protocol data—They are desirable distinction of WCTS sever system.

According the second aspect of this invention, regarding WCTS terminal that connects with WCTS server system providing caption telephone service, Monitoring part that monitors communication events in order to link with WCTS sever system; WCTS application part that is executed by the control of monitoring part in response to communication events; said WCTS server system includes communication module part for receiving or transferring voice data, from the other user's terminal, through already established Second Voice Traffic Path, receives the other user's voice data, through already established Third Voice Traffic Path, transfers said other user's voice data to a relay center, receives said caption data produced from said other user's voice data, from said relay center and through already established Second Caption Traffic Path, transfers said caption data through already established First Caption Traffic Path to said WCTS terminal—can be provided.

Said Monitoring Part upon the receipt of receiving incoming call events, if the sender of voice call is said WCTS server system, without ringing the automatic answering is executed. If not call from WCTS sever system, the ring will be given to the user. When the user answered the phone, WCTS application program will be initiated. If in the case of both sending and receiving calls, if voice data are not received or sent by using circuit network, it is recommended that the function of ending the voice call should be executed.

According to the third aspect of this invention, regarding caption telephone service method executed in WCTS sever system, the step that receives voice data from the other user's terminal through already established Second Voice Traffic Path; the step that through already established Third Voice Traffic Path transfers said voice data to relay center; the step that from above mentioned relay center, through previously established Second Caption Traffic Path receives caption data produced from said voice data; the step that transfers said voice data through previously established First Voice Traffic Path and said caption data through Second Caption Traffic Path to WCTS terminal. Caption Telephone Service Method including said steps can be provided.

According to the fourth aspect of this invention, regarding Caption Telephone Service Method that is executed in WCTS terminal, the step that from WSTS server system receives the other user's voice data and caption data produced from said other user's voice data; Caption Telephone Service Method can be provided, which includes the steps outputs said other user's voice data and caption data produced from said user's voice data. Said WCTS server system, from said user's terminal, through previously established Second Voice Traffic Path receives the said other user's voice data, through previously established Third Voice Traffic Path transfers said other user's voice data to relay center, from said relay center receives the other user's voice data through previously established First Voice traffic Path and transfers other user's voice data to said WCTS terminal through First Caption Traffic Path.

Said receiving step and outputting step, in order to be linked with said WCTS server system, should be caption telephone service method that is executed by control of monitoring part that monitors communication events.

Effects of Invention

The following results can be expected from this invention.

This invention of caption telephone service providing method provides the function to allow a deaf person who can speak to directly call the other user with telephone numbers stored in WCTS terminal and also directly to receive calls from the other user by providing the a deaf person who can speak with the same way of using telephone as a normal person.

This invention of WCTS server system has advantage to help a deaf person who can speak to avoid exposing his handicap to the other user by allowing the other party user to directly dial number to the handicapped person without using the representative number of relay center.

Additionally, in terms of the WCTS terminal of a deaf person who can speak, when it comes to receiving calls, the same success rate of receiving calls of the other party's terminal can be guaranteed. The consumption of power can be reduced by removing periodical packet communication that is used to manage mobility of the terminal.

DETAILED EXPLANATION OF THE INVENTION

Figure 1:
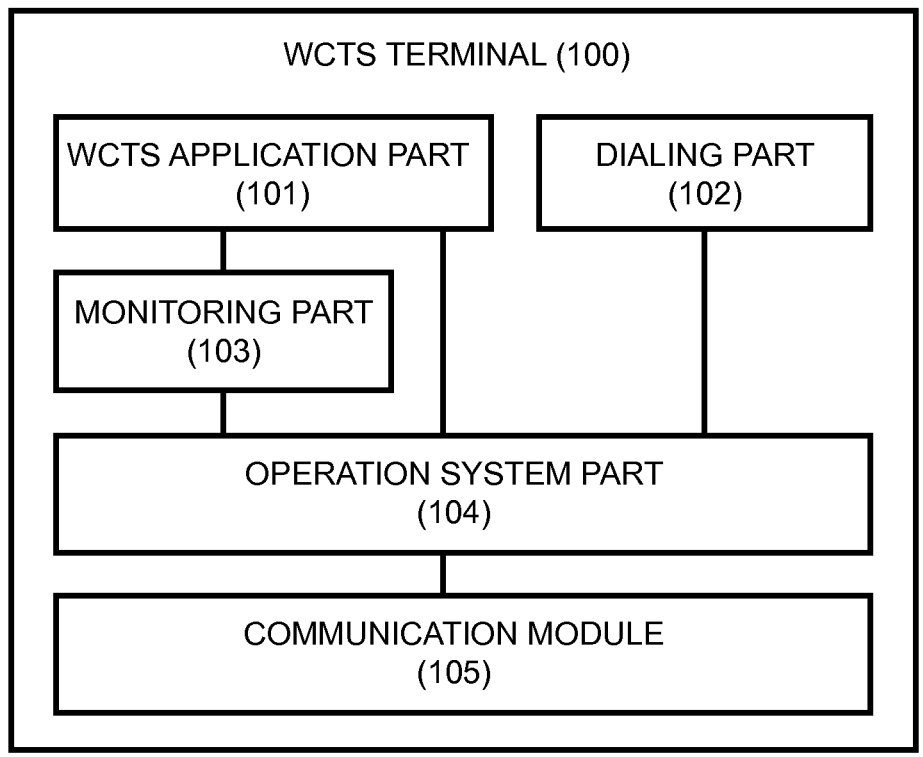
FIG. 1 is a Block Diagram for a WCTS terminal according to a preferred embodiment of the present invention.

Below, referring to attached drawings, a preferred embodiment of the present invention is explained.

Be cautious that in adding reference numerals to the elements of each drawings, the same numerals will be added to the same elements as much as possible even if they are shown in the different drawings. Also in explaining the present invention, if the specific explanation of related known structure or function of the present invention would make the subject matter of invention unclear, the specific explanation is omitted.

FIG. 1 is the structure of WCTS terminal. The WCTS in FIG. 1 is composed of Terminal basically including Dialing Part (102), Operation System Part (104), Communication Module Part (105) and WCTS Monitoring Part (101) including Monitoring Part (103).

As described in FIG. 1, said Dialing Part (102) is linked to said Communication Module Part (105) by using said Operation System Part (104) and operates when an user calls or receives calls. The state of communication of said Communication Module Party (105) or events produced by said Dialing Part (102) during receiving or transferring calls are transferred to said Monitoring Part (103) through said Operation System Part (104). Said Monitoring Part (103) executes the start and end of WCTS Application Part (101) by using the events. Said WCTS Application Part (101) is an application program for the reception of WCTS service and executed by said Monitoring Part (103). After being executed, it is connected to WCTS server system by using communication module part (105) through operation system part (104) and receives and transmits voice data or caption data literated from voice data.

Figure 2:
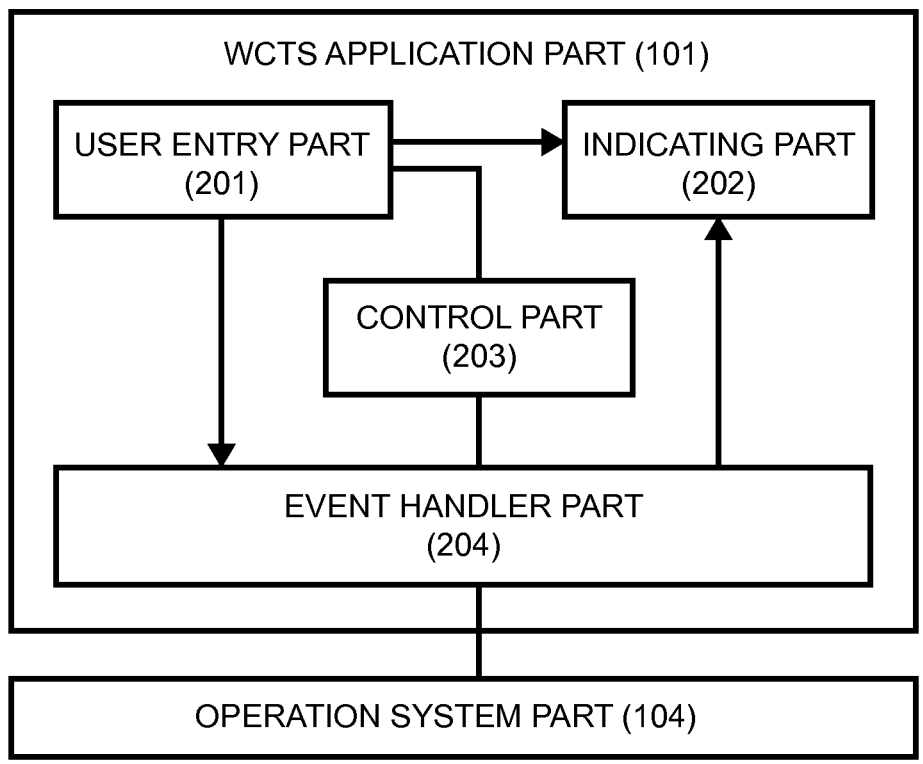
FIG. 2 is a Block Diagram of WCTS Application Part according to a preferred embodiment of the present invention.

FIG. 2 is a block diagram indicating WCTS Application Part included in WCTS terminal and performing WCTS function.

As described in FIG. 2, said WCTS Application Part (101) comprises a User Entry Part (201) processing user's entry, an Display Part (202) displaying letters entered by user or caption data received from WCTS Server System (300), a Control Part (212) controlling the action of WCTS Application Program and an Event Handler Part (204) that is linked with said Operation System Part (104).

Said Event Handler Part (204) transfers events related to voice call among events received from said Operation System Part (104) or controlling message from said WCTS Server System (300) to Control Part (203), and transfer said caption data to Display Part (202). Said Display Part (202) expresses delivered caption data by display device.

On the other hand, said User Entry Part (201) displays data such as letters entered by user at Display Part (202) and also simultaneously transfers the data through said Event Handler Part (204) to said WCTS Server System (300), and also delivers link control message with WCTS Server System (300) by user's entry to Control Part (203) and this delivery executes link-control of WCTS Application Part (101) and WCTS Server System (300).

Figure 3:
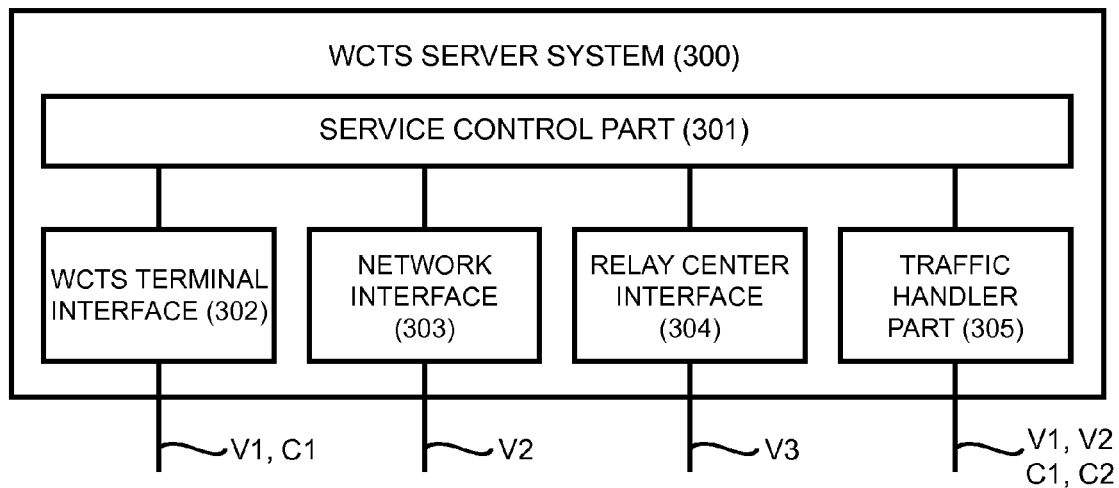
FIG. 3 is a Structure Diagram of WCTS Server System according to a preferred embodiment of the present invention.

FIG. 3 is a structure diagram showing WTCS Server System structured in network aspect and providing WCTS service.

Said WCTS Server System (300) comprises WCTS Terminal Interface (302) Part that is linked with WTSC terminal (100) and controls calls, Network Interface (303) that is linked with the other user's terminal (603) and controls calls, Relay Center Interface (304) that is linked with relay center and controls calls, Handler Part for handling of voice traffic path established by each of above mentioned interfaces and Service Control Part (301) controlling relays.

Said WTCS Terminal Interface (302) through First Voice Traffic Path (V1) and First Caption Traffic Path (C1) interfaces with WCTS terminal (100), said Network Interface (303) through First Voice Traffic Path (V1) and First Caption Traffic Path (C1) interfaces with WCTS terminal (100), said Network Interface (303) for incoming calls to sad WCTS terminal (100) pages, through Second Voice Traffic Path (V2) interfaces with the other user's terminal (603). And said Relay Center Interface (304) through Third Voice Traffic Path and Second Caption Traffic Path (C2) interfaces with Relay Center (602).

Figure 4:
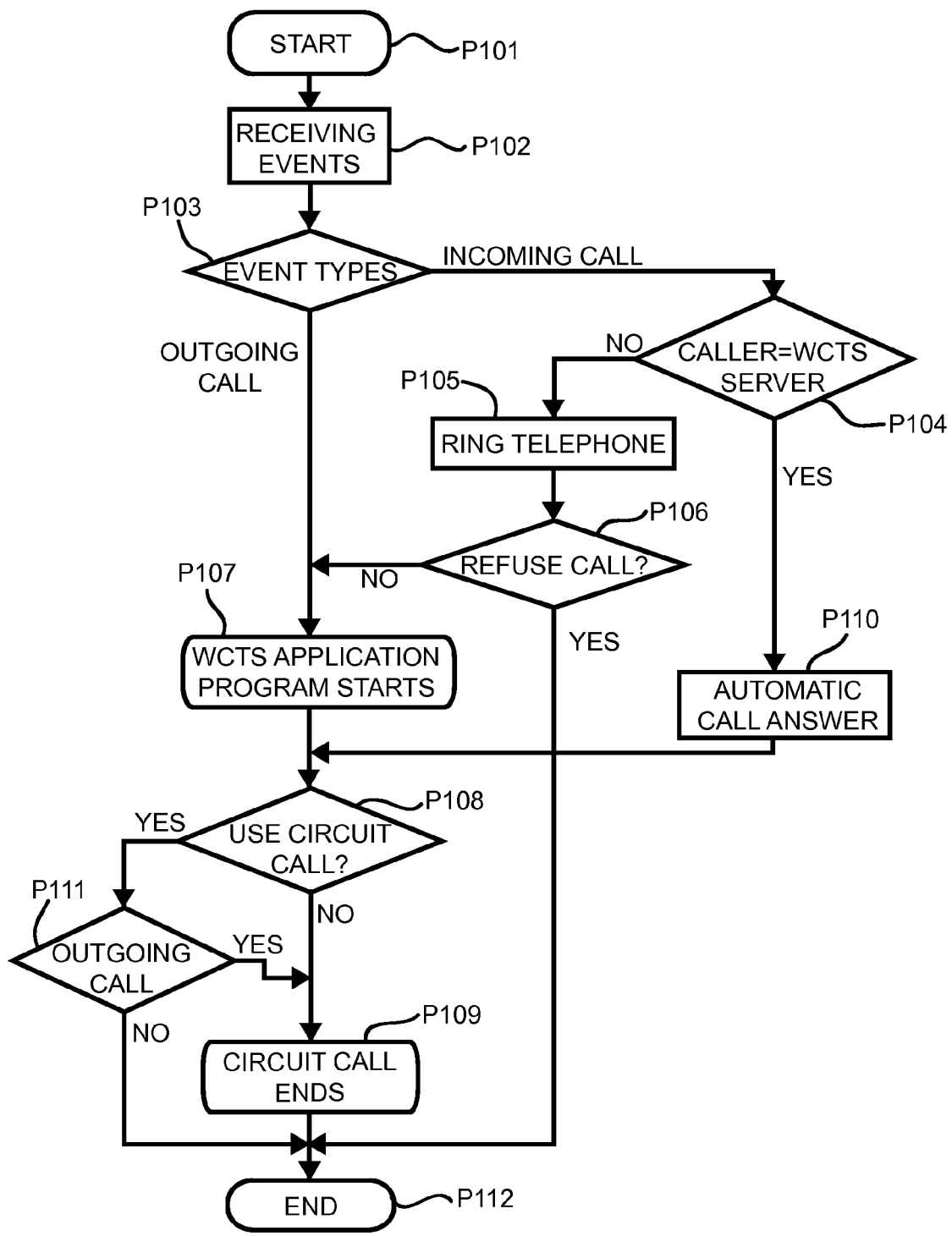
FIG. 4 is a Function Flow Diagram of Monitoring Part of WCTS Terminal according to a preferred embodiment of the present invention.

FIG. 4 is a flow diagram showing monitoring action of the present invention's WCTS terminal. First, the process of treating outgoing call from said Monitoring Part (103) will be explained. Said Monitoring Part (103) stands by on the initial stage (P101) and receives events (P102). If an event is an outgoing call event after determining types of received events, determine whether WCTS terminal (100) is set up to receive voice data by circuit network (P108) after executing WCTS Application Part (101). If receipt or transmission of call is not necessary, end circuit call (P109). If receipt or transmission of call is necessary, above mentioned Monitoring Part (103) completes treating process (P112) and stands by on the initial stage. Even if circuit call is set to be used in the outgoing call process, end circuit call (P111).

Next, if on the initial stage (P101) received event (P102) is incoming call event and incoming caller's number is same (P104) as number of WCTS Server System (300), without ringing automatically answer the phone and automatically link with Voice Traffic Path (P110) and then complete treating process (P112) through related process after determining whether circuit call will be used (P108).

If incoming caller's number is not WCTS Sever System's number, determine that the call is received from the other user's terminal (603) and then deliver vibration or light or sound ring signal to the user of said WCTS terminal (100). During the ringing process, if WCTS terminal (100) user refused to answer (P106), complete the process. If answering the phone (P106), execute WCTS Application Part (101). And then, after determining whether circuit call should be used (P108), end the process through related process (P112).

Figure 5:
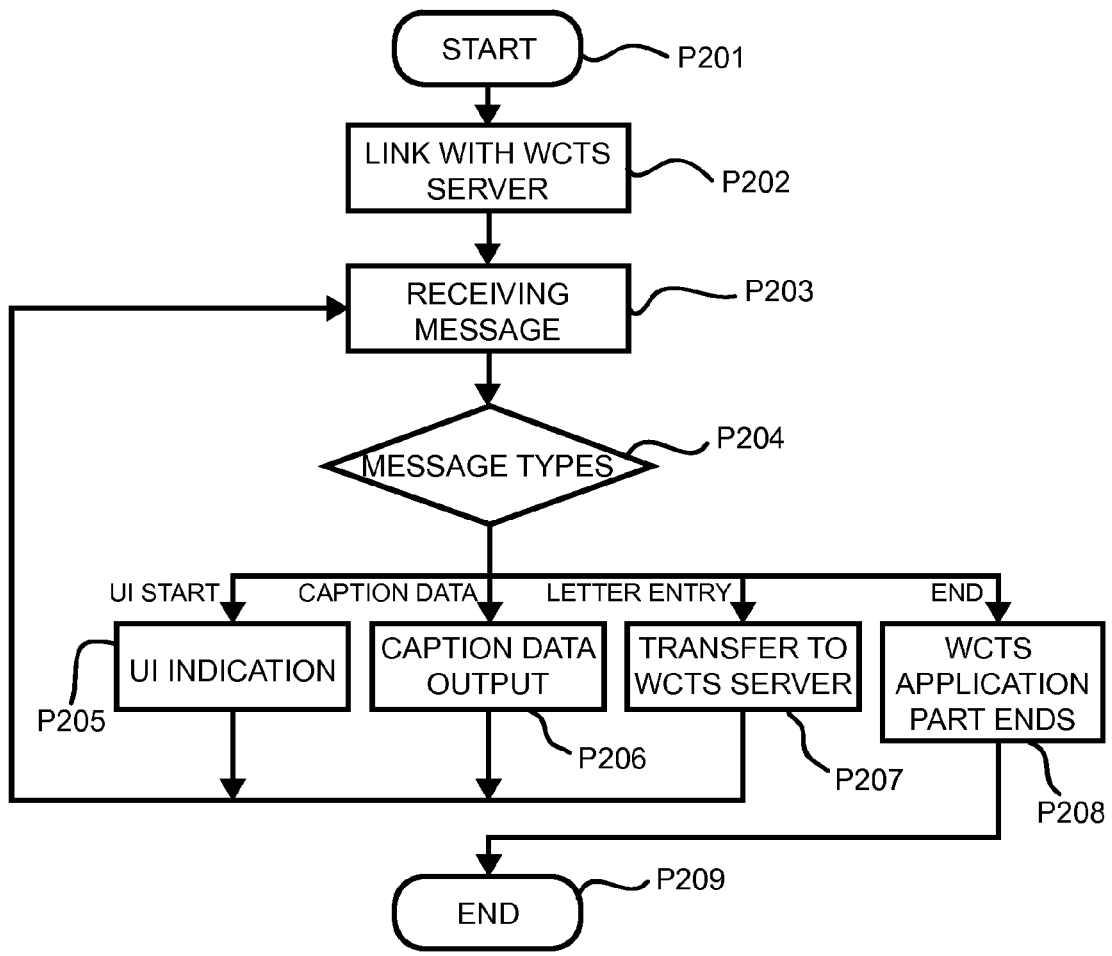
FIG. 5 is a Function Flow Diagram of Application Program of WCTS Terminal according to a preferred embodiment of the present invention.

FIG. 5 is a flow diagram showing action of WCTS Application Part executed by WCTS terminal's Monitoring Part.

When said WCTS Application Part (101) is initiated by Monitory Part (103) (P201), by using previously saved information of WCTS Sever System (300) attempt to link (P202). After the completion of linking, stand by on the stage of receiving message (P203).

WCTS Application Part acts in different manners according to types of message received from said WCTS server (300) System. First, if received message is the one instructing the user to indicate UI, WCTS Application Part (101) displays (P205) on the screen Display Part (202) that will show received message and UI of User Entry Part (201) including input window. If the received message is the caption letter data from the other user's voice data, output (P206) on Display Part (202). If the receive message is letters entered from User Entry Part (201), transfers (P207) to WCTS Server (300). If the received message is above mentioned WCTS Application Part (101)'s end order, stand by on the stage of receiving process (P203) after ending (P208) and completing process (P209).

Figure 6:
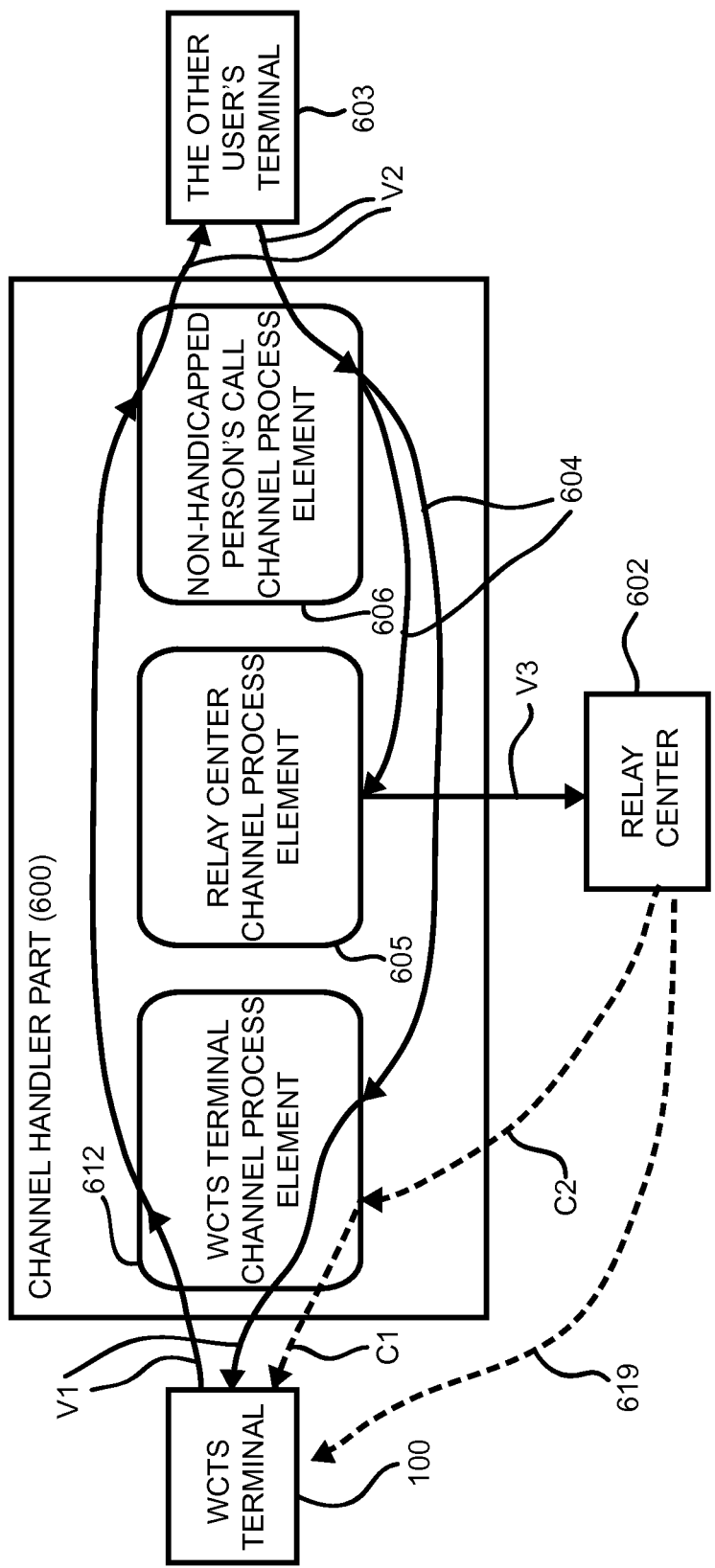
FIG. 6 is a Channel Structure Diagram and Voice/Data Flow Diagram of Handler Part of WCTS System Server according to a preferred embodiment of the present invention.

FIG. 6 is a concept diagram showing the flows of data including voice and caption data in which Channel Handler part constructs WCTS terminal device and channel is set in the middle of call between the user of the WCTS terminal device and the other user of the other terminal device.

Said Handler Part (305) include many Channel Handler Parts (600), one Channel Handler Part (600) comprises WCTS terminal Channel Process Element (612) that interfaces through First Voice Traffic Path (VI) that can transfer and receive WCTS terminal (100) and Voice Data; Relay Center Channel Process Element (605) that delivers voice data to Relay Center (602) through Third Voice Traffic Path (V3) and Terminal Channel Process Element (606) that can transfer and receive the other user's terminal (603) and voice data through Second Voice Traffic Path (V2).

First, the flow of data transferred from the other party user's terminal (603) to said WCTS terminal (100) will be explained.

When voice data is transferred from the other user's terminal, by the process of controlling call, through previously established Second Voice Traffic Path (V2), the other party user's Terminal Channel Process Elements (606) inside the Channel Handler Part (600) included in WCTS Server System (300) will receive.

Said Terminal Channel Process Elements (606) transfers the received voice data to Relay Center Channel Process Element (605) and simultaneously transfer (614) to WCTS terminal Channel Process Element (612). Said Relay Center Channel Process Element (605) transfers received voice data to Relay Center (602) by process of controlling calls through previously established Third Voice Traffic Path (V3). Said Relay Center (602) turns the received voice data into letters, transforms them into caption data and transfers said caption data by using First and Second Caption Traffic Path (C1, C2) linked to packet network to WCTS Terminal (100). The Path used for the transfer of said caption data can be established (619) directly with WCTS terminal (100) and indirectly established through WCTS Server System (300) with WCTS terminal (100) (C1, C2).

On the other hand, said WCTS Terminal Channel Process Element (612) that is transferred voice data from said Terminal Channel Process Element (606) transfers related voice data by the process of controlling calls through First Voice Traffic Path (V1) to WCTS terminal (100).

Next, the flow of voice data transferred from WCTS terminal (100) to the other user's terminal (603) will be explained. When voice data is transferred by said WCTS terminal (100), by the process of controlling calls through previously established First Voice Traffic Path (V1), Channel Hander Part (600)'s said Terminal Channel Process Elements (612) receives the data. This channel handler part (600) is included in WCTS Sever System (300). Said WCTS terminal Channel Process Element (612) transfers received voice data to the other user's terminal Channel Process Element (606), said the other user's terminal Channel Process Element (606) transfers said voice data to the other user's terminal (603) by the process of controlling calls through previously established Second Voice Traffic Path (V2).

Figure 7:
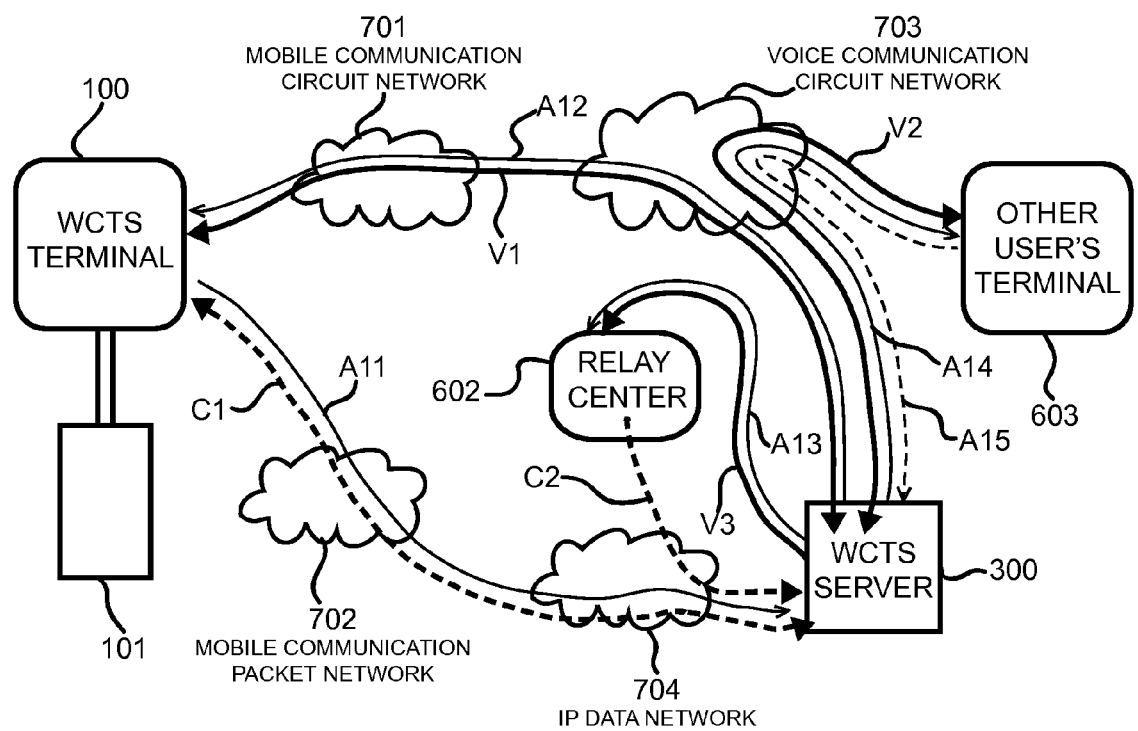
FIG. 7 is a Structure Diagram indicating that outgoing call service is provided by separating transfer paths for voice data and caption data in WCTS terminal according to a preferred embodiment of the present invention.

FIG. 7 is a structure diagram showing provision of outgoing call service by separating paths of voice data between WCTS Sever System of this invention and WCTS Terminal and caption data.

If user dials by WCTS terminal (100), by the process of FIG. 4 and FIG. 5, WCTS Application Part (101) initially sends message including his own number and the number of the user's terminal to WCTS Server System (300). Subsequently through mobile communication packet, network (701) and Internet protocol data network (704, in below I.P network), the initial connecting request processes (A11). Caption Traffic Path (C1) is established by using reciprocally mobile communication packet, network (701) and IP network.

After the completion of said caption traffic path (C1), said WCTS Server System (300) through voice communication network (703, here voice communication network include the concept of VoIP using data) and mobile communication circuit network attempts to establish Voice Traffic Path (a12) by attempting outgoing call with the number of said terminal (100). Said WCTS terminal (100) acts to establish Voice Traffic Path (V1) after confirming that call is from said WCTS Server System (300). Upon the completion of Voice Traffic Path, said WCTS Server System (300) by using said voice communication network (703) attempts to establish (a 13) Voice Traffic Path to Relay Center (602). Upon the establishment of Voice Traffic Path (V3) between said Relay Center (602) and said WCTS Server System (300), simultaneously through IP network caption traffic path (C2) is also established. From this point, every situation created from the establishment of the other user's terminal (603) and said Voice Traffic Path (V2) will be turned into letters and then will be transferred to said WCTS terminal (100) through said WCTS Server System (300).

After the completion of said Voice Traffic Path (V3), said WCTS Server System (300) through the other user's terminal (603) and said voice communication network (703) begins to establish said Voice Traffic Path (a14). When said other user's terminal (603) user answers the call (a15), said Voice Traffic Path (V2) is established and WCTS Service Provision Process is completed. Said WCTS Terminal (100) user by WCTS Server System (300) receives other user's both voice data and caption data with letters and the other user's terminal user will talk over the phone by receiving the voice data of WCTS terminal user, a deaf person who can speak.

Figure 8:
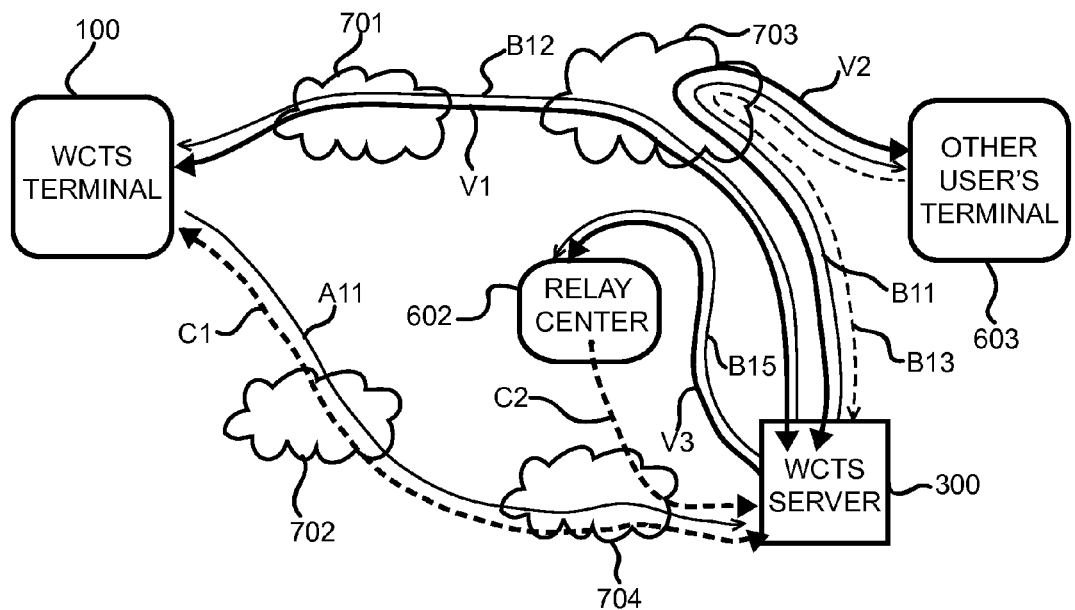
FIG. 8 is a Structure Diagram indicating that incoming call service using circuit-eased voice service is provided by separating transfer paths for voice data and caption data in WCTS terminal according to a preferred embodiment of the present invention.

FIG. 8 is a structure diagram showing provision of incoming call service by separating paths of voice data between WCTS Sever System of this invention and WCTS Terminal, and caption data by circuit voice service.

If user of the other user's terminal (603) directly dials the phone number of WCTS terminal (100), delivers applicable call connection request message WCTS Server System (300) (b11) by performing number translating and louting function, applicable call connection request message. Said WCTS Server System (300) through voice communication network (703) and mobile communication circuit network (701), attempts call connection request to said WCTS Terminal (100). When said WCTS terminal (100) answers the call connection request, Voice Traffic Path (V1) is established, said WCTS Server System (300) establishes Voice Traffic Path (V2) and notifies the beginning of call to the other user's terminal (603) (b13). When the Voice Traffic Path (V1) is established by said WCTS terminal (100)'s response, said WCTS terminal (100) initiates the connection request process (b14) by sending the message including his own number and the other terminal (603)'s number, by mutually using mobile communication packet network (702) and IP network (704) establishes caption data path (C1). Upon completion of establishment of caption traffic path (C1), said WCTS Server System (300) through said network (703) attempts to establish Voice Traffic Path to said relay center (602) (b15).

Upon the establishment of Voice Traffic Path (V3) between said relay center (602) and WCTS Sever System (300), simultaneously through IP network, Caption Traffic Path (C2) is established. When said Caption Traffic Path (C2) is established, the process for WCTS Service Provision is completed. WCTS terminal (100) receives the other user's voice data and caption data.

Figure 9:
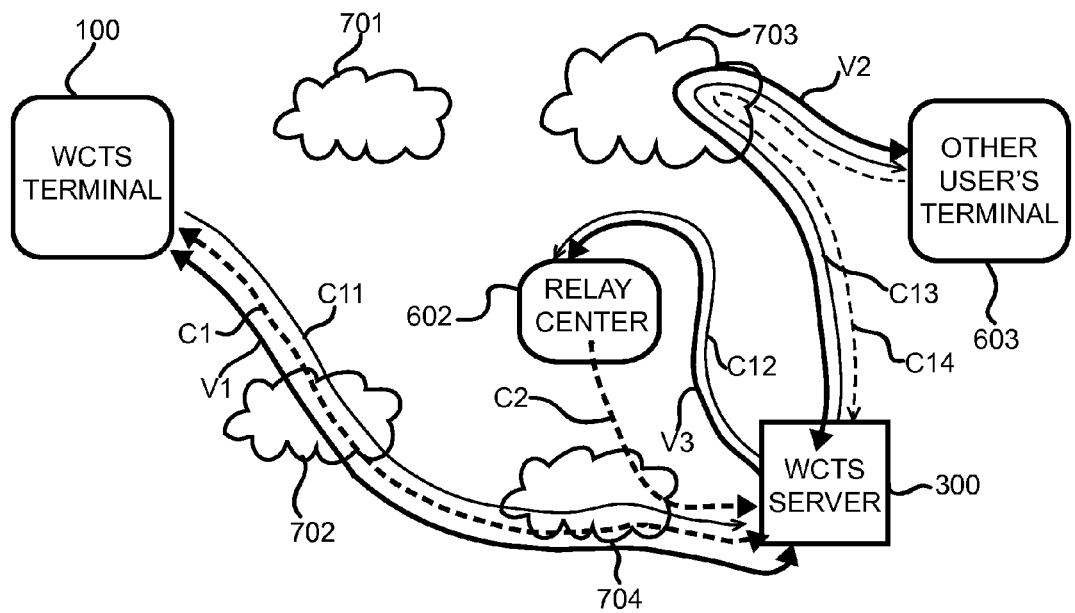
FIG. 9 is a Structure Diagram indicating that outgoing call service by using voice data and caption data in the same transfer path in WCTS terminal according to a preferred embodiment of the present invention.

FIG. 9 is a structure diagram showing outgoing call service that delivers voice data and caption data by using same path between the present invention's WCTS Server System and WCTS Terminal.

If user dials by WCTS Terminal (100) by the process of FIG. 4 and FIG. 5, WCTS Application Part (101) starts initial process of connection request (c11) by using mobile communication pack network (702) and IP net work (704) by sending message including his own number and the number of the other user's terminal (603) to WCTS Server System (300), and establishes Data Traffic Path (C1) and Voice Traffic Path (V1) through said mobile communication packet network (702) and said IP network.

Upon the completion of said Caption Traffic Path (C1) and above mentioned Voice Traffic Path (V1), said WCTS Server System (300) by using voice communication network (703) attempts to establish Voice Traffic Path (c12) to Relay Center (602). Upon the establishment of said Voice Traffic Path (V3) between above mentioned Relay Center (602) and above mentioned WCTS Server (300), simultaneously Caption Traffic Path (C2) is established by using IP network (704). From this point, every situation created from establishment of non-handicapped person's phone (603) and Voice Traffic Path (V2) is turned into letters and delivered to WCTS Terminal (100) by WCTS Server (300).

Upon the establishment of Voice Traffic Path (V3), WCTS Server System (300) through said other party user's terminal (603) and said voice communication network (703) attempts the establishment of Voice Traffic Path (c13). If said user of the other user's terminal answers the phone (c14), Voice Traffic Path (V2) is established and the process for WCTS service provision is completed.

Figure 10:
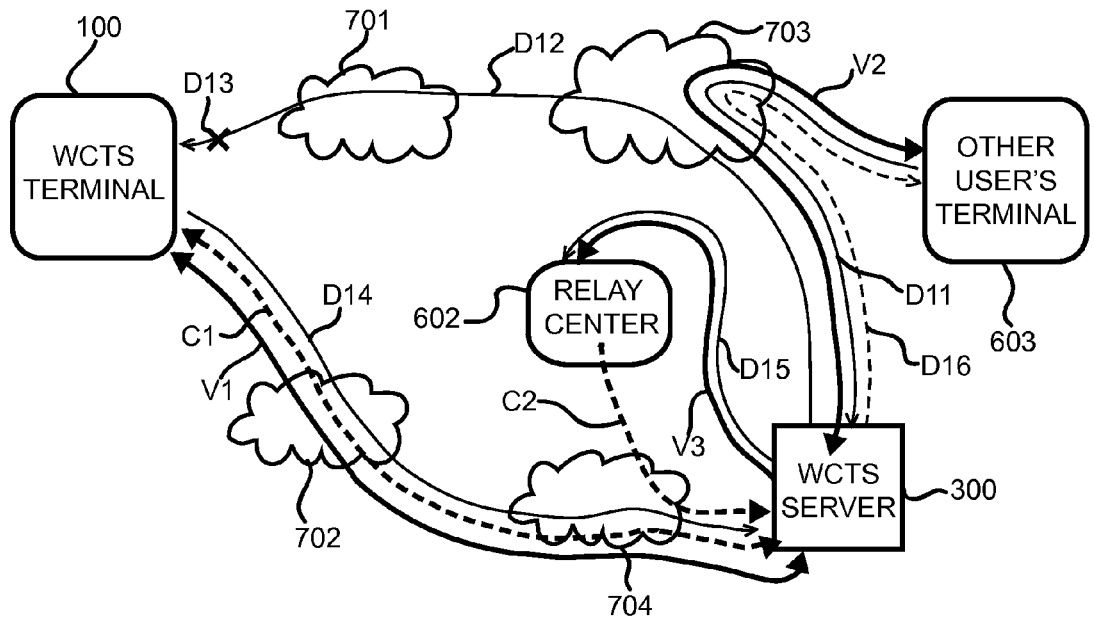
FIG. 10 is a Structure Diagram indicating that incoming call service using circuit-eased voice service by using voice data and caption data in the same transfer path in WCTS terminal according to a preferred embodiment of the present invention.

FIG. 10 is a structure diagram showing incoming call service that by using circuit voice service delivers voice data and caption data by using same path between the present invention's WCTS Server System and WCTS Terminal.

If user of the other user's terminal (603) directly dials the number of WCTS Terminal (100), voice communication network (703) delivers the connection request about applicable call (d11) to WTCS Server System (300) by performing function of number translation and routing. Said WCTS server system (300) attempts call connection request (d12) to said WCTS terminal device (100) using the mobile communication circuit network (701). Said WCTS Terminal (100) ends voice calls immediately after responding voice call (d13). If said WCTS terminal (100) refuses incoming call or does not answer the call, all paths are cancelled and ended, but if user answers the call, said WCTS terminal (100) processing connection request (d14) by sending message including his own number and the number of the other terminal (603) to said WCTS Server System (300) and establishes Caption Traffic Path (C1) and Voice Traffic Path (V1) by using mutual mobile communication packet network (702) IP network (704).

Upon the completion of establishment of Caption Traffic Path (C1) and Voice Traffic Path (V1), said WCTS Server System (300) by using voice communication network (703) attempts to establish Voice Traffic Path to Relay Center (602) (d15), simultaneously establishes Voice Traffic Path (V2) by using the other party's terminal (603) and voice communication network (703) and notifies to the other user that the communication initiates (d16). In the process of establishment of Voice Traffic Path (V3) between above mentioned relay center (602) and said WCTS Server System (300) by using above mentioned voice communication network (703), Caption Traffic Path (C2) is also established by using IP network (704). Upon the establishment of said Caption Traffic Path (C2), Process for WCTS service provision is completed and said WCTS terminal (100) receives the other terminal's voice data and caption data by said WCTS Server System (300).

Figure 11:
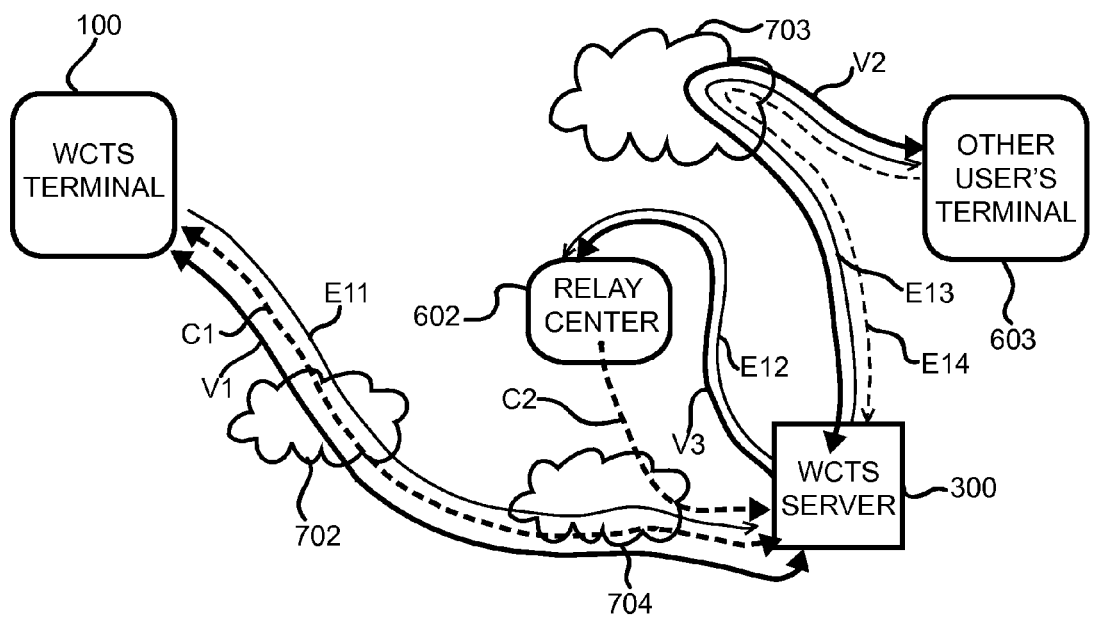
FIG. 11 is a Structure Diagram indicating that the outgoing call service is provided by using exclusive user interface (UI) and by using same transfer paths for voice data and caption data in WCTS terminal according to a preferred embodiment of the present invention.

FIG. 11 is a structure diagram showing that the present invention's WCTS Server System provides outgoing call service that delivers voice data and caption data to WCTS Terminal using user only Interface (UI) by using same path.

When user dials by using user only interface of WCTS terminal (100), message including his own number and the number of the other user's terminal (603) is initially delivered to WCTS Server System (300) and the initial connect request process begins (e11) by using mobile communication packet network (702) and IP network (704). By using mobile communication packet network (702) and IP network (704) mutual caption traffic path (C1) and Voice Traffic Path (V1) is established. Upon the completion of establishment of Caption Traffic Path (C1) and Voice Traffic Data (V1), said WCTS Server System (300) by using voice communication network (703) attempts to establish Voice Traffic Path (e12) to Relay Center (602). In the process of establishment of Voice Traffic Path (V3) by using voice communication network (703) between said Relay Center (602) and WCTS Server System (300), Caption Traffic Path is also established by using IP network (704). From this point, every situation created from establishment of other user's terminal (603) and Voice Traffic Path (V2) is transferred in letters to said WCTS Terminal (100) by said WCTS Server System (300). Upon the completion of Voice Traffic Path (V3), WCTS Server System (300) begins Voice Traffic Path by using the other party's terminal (603) and voice communication network (703) (e13). If said the other party's terminal (603) answers the call (e14), Voice Traffic Path using above mentioned voice communication network (703) and the process for WCTS service provision is completed.

Figure 12:
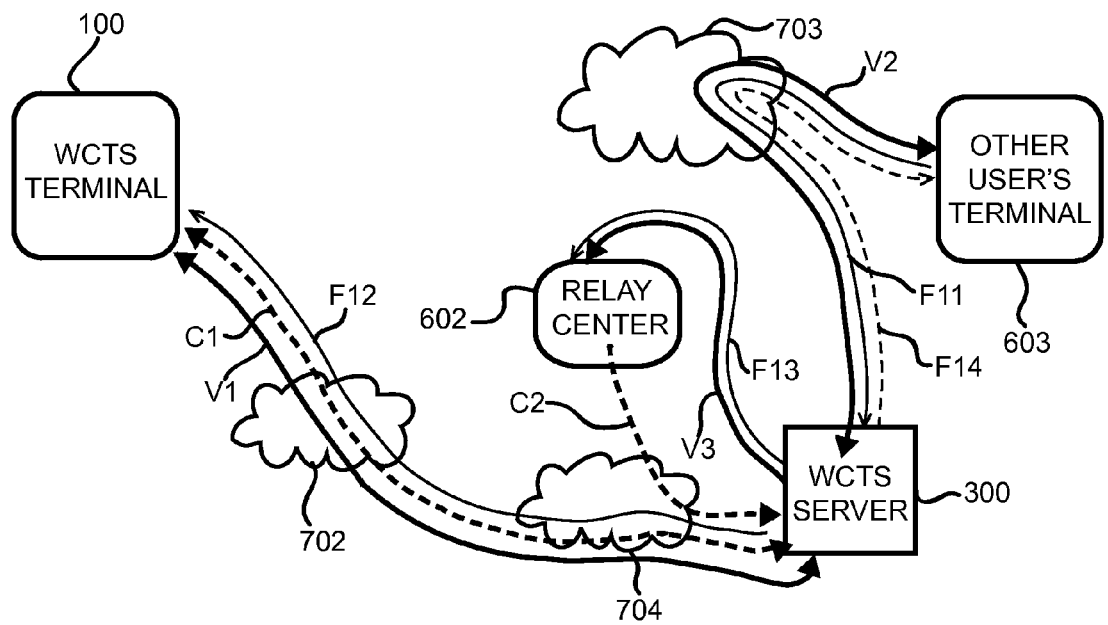
FIG. 12 is a Structure Diagram indicating that the incoming call service is provided by using an exclusive user interface (UI) and by using same transfer paths for voice data and caption data in WCTS terminal according to a preferred embodiment of the present invention.

FIG. 12 is a structure diagram showing that the present invention's WCTS Server System to WCTS terminal using user only interface (UI) by the same path provides incoming call service that delivers voice data and caption data.

If user of the other user's terminal (603) directly dials the number of WCTS terminal (100), voice communication network (703) delivers message requesting connection with applicable number to WCTS Server System (300) (f11) by performing the function of number translation and louting. Said WCTS Server System (300) attempts the connection with applicable call to WCTS Terminal including the received request for connection with applicable number message by using IP network (704) and mobile communication packet network (702) (f12). Said WCTS terminal (100) responses to voice call. If incoming call is refused or the phone is not answered, all paths are cancelled or end, but if the call is answered the reciprocal Caption Traffic Path (C1) and Voice Traffic Path (V1) are established. Upon the completion of said Caption Traffic Path (C1) and said Voice Traffic Path by using IP network (704) and mobile communication packet network (702), said WCTS Server System (300) through voice communication network (703) attempts (f13) establishment of Voice Traffic Path to Relay Center (602). Simultaneously said WCTS Server System (300) by using the other user's terminal and said voice communication packet network (703) establishes Voice Traffic Path (V2) and notifies to the other user's terminal (603) that the call begins (f14). By using said voice communication network (703) between said Relay Center (602) and said WCTS Server System (300), Voice Traffic Path is established and simultaneously Caption Traffic Path (C2) is established by using IP Network (704). Upon the establishment of said Caption Traffic Path (C2), the process for WCTS service provision is completed.

Figure 13:
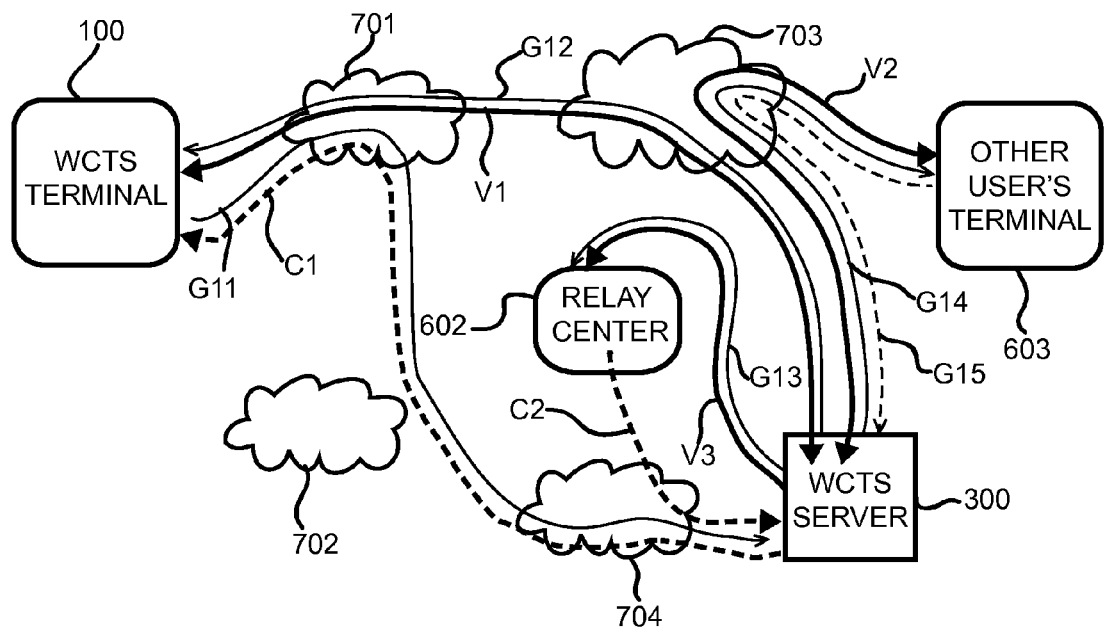
FIG. 13 is a Structure Diagram indicating outgoing call service using USSD function for circuit-eased voice service and caption data transmission is provided according to a preferred embodiment of the present invention.

FIG. 13 is a structure diagram showing that voice data between the present invention's WCTS Server System and WCTS Terminal uses circuit wire service and Caption Traffic Transfer uses USSD and provides outgoing call.

If user dials by WCTS Terminal (100), by the process of FIG. 4 and FIG. 5, information including his own number and the number of the other user's terminal (603) is transferred to WCTS Server System (300) by using the USSD (Unstructured Supplementary Service Data) function of mobile communication circuit network (g11). Said WCTS Server System (300) by using voice communication network (703) and mobile communication circuit network (701) attempts establishment of said WCTS terminal (100) and Voice Traffic Path (g12). Said WCTS terminal (100) automatically acts to establish Voice Traffic Path (V1) after confirming that the call is from said WCTS Server System (300). Upon the establishment of Voice Traffic Path with said WCTS Terminal (100) (g12), said WCTS Server System (300) by using voice communication network (703) attempts the establishment of Voice Traffic Path (g13) to Relay Center (602). Upon the establishment of Voice Traffic Path (V3) between said relay center (602) and said WCTS Server (300) by using said voice communication network (703), Caption Traffic Path (C2) is simultaneously established by using IP network. Said WCTS Server System (300) by using USSD function provided by mobile communication circuit network begins to sends letters to user. From at this point, every situation created from the establishment of the other user's terminal (603) and Voice Traffic Path (V2) is turned into letters and is sent to said WCTS terminal (100) by said WCTS Server System (300). Upon the completion of Voice Traffic Path (V3) by using said voice communication network (703), said WCTS Server System (300) by using voice communication network (703) begins to establish Voice Traffic Path with the other user's terminal (603) (g14). If the other party answers the call (g15), Voice Traffic Path is established and the process of WCTS service provision is completed.

Figure 14:
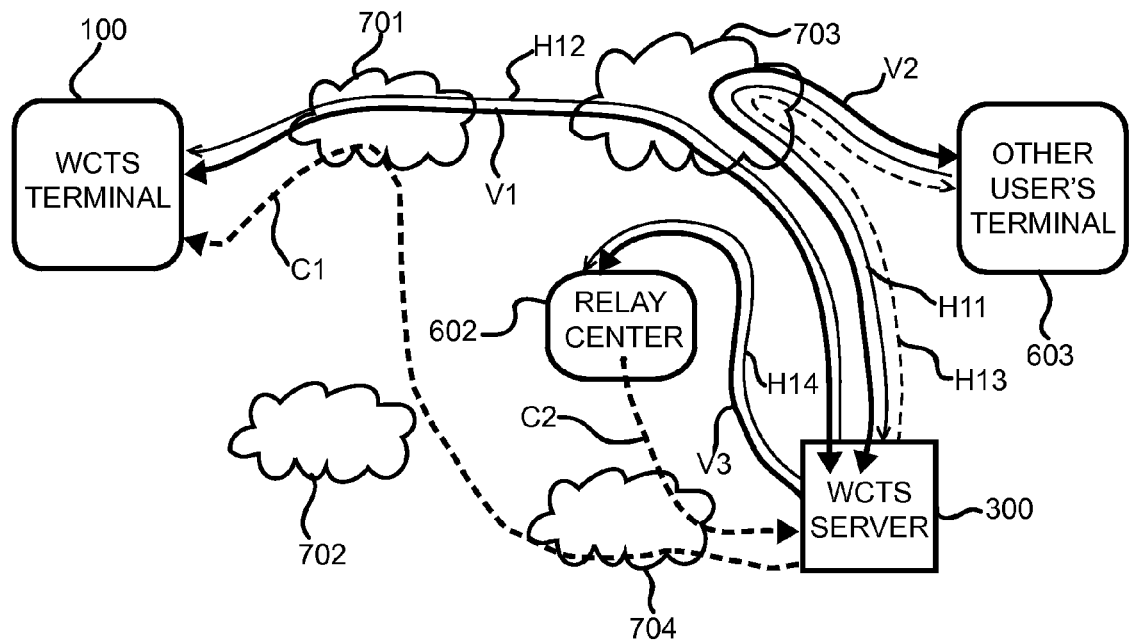
FIG. 14 is a Structure Diagram indicating incoming call service using USSD function for circuit-eased voice service and caption data transmission is provided according to a preferred embodiment of the present invention.

FIG. 14 is a structure diagram showing incoming call service is provide by using circuit wire service for voice data between the present invention's WCTS server system and by using USSD for caption data transfer.

If user of the other terminal (603) directly dials the number of WCTS terminal (100), the request for by using voice communication network (703) delivers request for connection with applicable number message to WCTS Server (300) (h11). Said WCTS Server System (300) attempts request for connection with applicable call (h12) by using said WCTS terminal (100), said voice communication network (703) and mobile communication circuit network (701) included in the message of request for connection with applicable call.

If said WCTS terminal (100) answers voice call, Voice Traffic Path (V1) is established and said WCTS Server System (300) establishes Voice Traffic Path (V2) with the other user's terminal and notifies to the other user's terminal (603) (h13) that the call begins. Said WCTS Server System (300) by using said voice communication network (703) attempts establishment of voice path (h14) to Relay Center (602). Upon the establishment of Voice Traffic Path (V3) between said Relay Center (602) and said WCTS Server System (300) by using said voice communication network (703), simultaneously Caption Data Path (C2) is established by using IP network (704). Upon the establishment of said Caption Traffic Path (C2), process for WCTS is completed. WCTS user is received by WCTS terminal (100) and WCTS Server (300), the other user's voice data is received by mobile communication circuit network and voice communication network, caption data is received by USSD Function provided by mobile communication circuit network and IP network.

The above explanation is only exemplary explanation about this invention. A person with general knowledge in the field of this invention can modify this invention in various manners within the essential nature of this invention. Therefore the purpose of illustrated execution examples in this invention is not to limit the technological ideas of this invention, but to explain. Thus, the scope of technological idea of this invention is not limited by the execution examples. The scope of protection for this invention should be interpreted within the scope of application below. All of technological ideas within the equivalent scope of this invention should be interpreted to be within the scope of invention right.

(Explanation of Reference Numerals)

| | |
|---|---|
| 100: WCTS Terminal | 101: WCTS Application Part |
| 103: Monitoring Part | 300: WCTS Server |
| 302: WCTS Terminal Interface | 303: Network Interface |
| 304: Relay Center Interface | 305: Handler Part |
| 602: Relay Center | 603: The other user's terminal |
| 701: Mobile Communication Circuit Network | 702: Mobile Communication Packet Network |
| 703: Voice Communication Network | 704: IP Network |
| V1: First Voice Traffic Path | V2: Second Voice Traffic Path |
| V3: Third Voice Traffic Path | C1: First Caption Traffic Path |
| C2: Second Caption Traffic Path | |

The invention claimed is:

1. A WCTS Server System comprising:
   a) a Wireless Captioned Telephone Service (WCTS) terminal,
   b) a WCTS Terminal Interface that establishes a First Voice Traffic Path and a First Caption Traffic Path by linking with the WCTS terminal;
   c) a Network Interface that establishes a Second Voice Traffic Path by linking with the other user's terminal;
   d) a Relay Center Interface that establishes a Third Voice Traffic Path and a Second Caption Traffic Path by linking with a Relay Center; and
   e) a Handler Part that handles at least one of said First Voice Traffic Path, said First Caption Traffic Path, said Second Voice Traffic Path, said Third Voice Traffic Path and said Second Caption Traffic Path;
wherein the WCTS terminal comprises:
i) a dialing part;
ii) an operation system part;
iii) a communication module part;
iv) a monitoring part; and
v) a WCTS application part;
wherein the dialing part is linked to the communication module part by using the operation system part and operates when an user calls or receives calls, wherein the state of communication of the communication module part and events produced by the dialing Part during receiving or transferring calls are transferred to the monitoring part through the operation system part, wherein the monitoring part executes the start and end of WCTS application part by using the events, wherein the WCTS application part comprises an application program for the reception of WCTS service, which is executed by the monitoring part, wherein after the WCTS application part is executed, the WCTS application part is connected to the WCTS server system by using the communication module part through the operation system part, and receives and transmits voice data or caption data literated from voice data;
wherein the WCTS application part comprises:
1) a user entry part processing user's entry;
2) a display part displaying letters entered by user or caption data received from the WCTS server system;
3) a control part controlling action of the program of the WCTS application part; and
4) an event handler part that is linked with the operation system part;
wherein the event handler part transfers events related to voice call among events received from the operation system part and controlling messages from the WCTS server system to the control part, and transfer the caption data to the display part, wherein the display part expresses the delivered caption data, wherein the user entry part displays data comprising letters entered by a user at the display part and simultaneously transfers the data through the event handler part to the WCTS Server System, and delivers a link control message with WCTS Server System by the user's entry to the control part, thereby executing link-control of the WCTS application part and the WCTS Server System;
wherein the WCTS Server System controls said WCTS Terminal Interface, said Network Interface, said Relay Center Interface and said Handler Part, receives voice traffic from said other user's terminal through above said Second Voice Traffic Path, transfers said voice traffic to above mentioned Relay Center through said Third Voice Traffic Path, receives caption data produced from said voice traffic from said Relay center through said Second Caption Traffic Path, and transfers said voice traffic through said First Voice Traffic Path and said caption data through said First Caption Traffic Path to said WCTS terminal.

2. The System of claim 1, wherein Said First Voice Traffic Path is established by using voice communication network and mobile communication circuit network, Said First Caption Traffic Path is established by using Internet Protocol Data Network and said Mobile Communication Packet Network, and Said First Voice Traffic Path and said First Caption Traffic Path are separated each other.

3. The system of claim 2, wherein Said Second Voice Traffic Path and said Third Voice Traffic Path are established by using Voice Communication Network, and Said Second Caption Traffic Path is established by using said Internet Protocol Data Network.

4. The system of claim 1, wherein Said First Voice Traffic Path and said First Caption Traffic Path are established by using Internet Protocol Data Network and Mobile Communication Packet Network, and Said First Voice Traffic Path and said First Caption Traffic Path are the same.

5. The system of claim 4, wherein Said Second Voice Traffic Path and said Third Voice Traffic Path are established by using Voice Communication Network, and Said Second Caption Traffic Path is established by using said Internet Protocol Data Network.

6. The system of claim 1, wherein Said First Voice Traffic Path is established by using Voice Communication Network and Mobile Communication Circuit Network, Said First Caption Traffic Path is established by using Internet Protocol Data Network and said Mobile Communication Circuit Network, Said Second Voice Traffic Path and said Third Voice Traffic Path are established by using said Voice Communication Network, and Said Second Caption Traffic Path is established by using said Internet Protocol Data Network.

7. The system of claim 6, wherein Said First Caption Traffic Path is established by using Internet Protocol Data Network and USSD (Unstructured Supplementary Service Data) of said Mobile Communication Circuit Network.

8. A WCTS Terminal that is combined with WCTS Server System providing Caption Telephone Service, comprising:
a) a dialing part;
b) an operation system part;
c) a communication module part;
d) a monitoring part; and
e) a WCTS application part;
wherein the dialing part is linked to the communication module part by using the operation system part and operates when an user calls or receives calls, wherein the state of communication of the communication module part and events produced by the dialing Part during receiving or transferring calls are transferred to the monitoring part through the operation system part, wherein the monitoring part executes the start and end of WCTS application part by using the events, wherein the WCTS application part comprises an application program for the reception of WCTS service, which is executed by the monitoring part, wherein after the WCTS application part is executed, the WCTS application part is connected to the WCTS server system by using the communication module part through the operation system part, and receives and transmits voice data or caption data literated from voice data;
wherein the WCTS application part comprises:
1) a user entry part processing user's entry;
2) a display part displaying letters entered by user or caption data received from the WCTS server system;
3) a control part controlling action of the program of the WCTS application part; and
4) an event handler part that is linked with the operation system part;
wherein the event handler part transfers events related to voice call among events received from the operation system part and controlling messages from the WCTS server system to the control part, and transfer the caption data to the display part, wherein the display part expresses the delivered caption data, wherein the user entry part displays data comprising letters entered by a user at the display part and simultaneously transfers the data through the event handler part to the WCTS Server System, and delivers a link control message with WCTS Server System by the user's entry to the control part, thereby executing link-control of the WCTS application part and the WCTS Server System;

wherein said WCTS Server System receives the other user's voice data from the other user's terminal through a previously established Second Voice Traffic Path, transfers said other user's voice data to a Relay Center through previously established Third Voice Traffic Path, receives said caption data produced from said other user's voice data from said Relay Center through a previously established Second Caption Traffic Path and transfers said other user's voice data to said WCTS Terminal through previously established a First Voice Traffic Path and said Caption Data through a previously established First Caption Traffic Path.

9. The terminal of claim 8, wherein Said First Voice Traffic Path is established by using Voice Communication Network and Mobile Communication Circuit Network, Said First Caption Traffic Path is established by using Internet Protocol Data Network and said Mobile Communication Packet Network, and Said First Voice Traffic Path and said Caption Traffic Path are separated from each other.

10. The terminal of claim 9, wherein Said Second Voice Traffic Path and said Third Voice Traffic Path are established by using said voice communication network, and Said Second Caption Traffic Path is established by using said Internet Protocol Data Network.

11. The terminal of claim 8, wherein Said First Voice Traffic Path and said First Caption Traffic Path are established by using Internet Protocol Data Network and Mobile Communication Packet Network, and Said First Voice Traffic Path and said First Caption Traffic Path are the same.

12. The terminal of claim 11, wherein Said Second Voice Traffic Path and said Third Voice Traffic Path are established by using Voice Communication Network, and Said Second Caption Traffic Path is established by using said Internet Protocol Data Network.

13. The terminal of claim 8, wherein Said First Voice Traffic Path is established by using Voice Communication Network and Mobile Communication Circuit Network, Said First Caption Traffic Path is established by using Internet Protocol Data Network and said Mobile Communication Circuit Network, Said Second Voice Traffic Path and said Third Voice Traffic Path are established by using said Voice Communication Network, and Said Second Caption Traffic Path is established by using said Internet Protocol Data Network.

14. The terminal of claim 13, wherein Said First Caption Traffic Path is established by using Internet Protocol Data Network and USSD (Unstructured Supplementary Service Data) of said Mobile Communication Circuit network.

15. The system of claim 8, wherein when incoming call events are delivered, if the caller of corresponding voice call is said WCTS Server System, said Monitoring Part does not ring and performs automatic answering call, and if the incoming call is not from said WCTS Server System, delivers ring to user of the WCTS terminal, and if the user of the WCTS terminal answers call, performs action to start WCTS Application Program, when outgoing call event is delivered, starts WCTS Application Program, when both outgoing and incoming events are delivered, ends circuit voice call if voice data is not received or transferred.

16. A method of providing caption telephone service executed in WCTS Server System comprising steps of:
a) receiving voice data from the other user's terminal through a previously established Second Voice Traffic Path;
b) transferring said voice data to a Relay Center through a previously established Third Voice Traffic Path;
c) receiving caption data produced from said Relay Center and from said voice data through a previously established Second Caption Traffic Path; and
d) delivering said voice data through a previously established First Voice Traffic Path and delivering said caption data through a previously established First Caption Traffic Path to WCTS Terminal;
wherein a WCTS Terminal that is combined with the WCTS Server System providing Caption Telephone Service, comprises:
i) a dialing part;
ii) an operation system part;
c) a communication module part;
d) a monitoring part; and
e) a WCTS application part;
wherein the dialing part is linked to the communication module part by using the operation system part and operates when an user calls or receives calls, wherein the state of communication of the communication module part and events produced by the dialing Part during receiving or transferring calls are transferred to the monitoring part through the operation system part, wherein the monitoring part executes the start and end of WCTS application part by using the events, wherein the WCTS application part comprises an application program for the reception of WCTS service, which is executed by the monitoring part, wherein after the WCTS application part is executed, the WCTS application part is connected to the WCTS server system by using the communication module part through the operation system part, and receives and transmits voice data or caption data literated from voice data;
wherein in a process of treating outgoing call from the monitoring Part, the monitoring part stands by on an initial stage and receives events, wherein after determining types of received events if the event is an outgoing call event, the monitoring part determines whether the WCTS terminal is set up to receive voice data by a circuit network after executing the WCTS application part;
wherein if receipt or transmission of call is not necessary, the monitoring part ends a circuit call, wherein if receipt or transmission of call is necessary, the monitoring part completes the process and stands by on the initial stage, wherein even if a circuit call is set to be used in the outgoing call process, the monitoring part ends the circuit call;
wherein if the received event on the initial stage is incoming call event and incoming caller's number is same as the number of WCTS Server System, the monitoring part automatically answers the call and automatically link with the Voice Traffic Path without ringing and then completes the process after determining whether the circuit call will be used, wherein if incoming caller's number is not WCTS Sever System's number, the monitoring part determines that the call is received from the other user's terminal and then delivers vibration or light or sound ring signal to the user of the WCTS terminal, wherein during the ringing process, if user of the WCTS terminal user refuses to answer the monitoring part completes the process, wherein if the user of the WCTS terminal answers the phone, the monitoring part executes the WCTS Application Part, and then, after determining whether the circuit call should be used, ends the process;

wherein when the WCTS application part is initiated by the monitoring part, the WCTS application part attempts to link with the WCTS server system by using previously saved information of the WCTS server system, wherein after the completion of linking, the WCTS application part stands by on a stage of receiving message, wherein if a received message is one instructing the user to indicate UI, the WCTS Application Part displays on a screen Display Part that will show received message and UI of a User Entry Part including input window, wherein if the received message is the caption letter data from the other user's voice data, the WCTS application part outputs the data on the Display Part, wherein if the received message are letters entered from the User Entry Part, the WCTS application part transfers the message to the WCTS server system, wherein if the received message is the WCTS Application Part's end order, the WCTS application part stands by on the stage of receiving process after ending the process.

17. The method of claim 16, wherein Said First Voice Traffic Path is established by using Voice Communication Network and Mobile Communication Circuit Network, Said First Caption Traffic Path is established by using Internet Protocol Data Network and said Mobile Communication Packet Network, and Said First Voice Traffic Path and said First Caption Traffic Path are separated from each other.

18. The method of claim 17, wherein Said Second Voice Traffic Path and said Third Voice Traffic Path are established by using said voice communication network, and Said Second Caption Data Traffic is established by using said Internet Protocol Data Network.

19. The method of claim 16, wherein Said First Voice Traffic Path and said First Caption Traffic Path are established by using Internet Protocol Data Network and Mobile Communication Packet Network, and Said First Voice Traffic Path and said First Caption Traffic Path are the same.

20. The method of claim 19, wherein Said Second Voice Traffic Path and said Third Voice Traffic Path are established by using Voice Communication Network, and Said Second Caption Traffic Path is established by using said Internet Protocol Data Network.

21. The method of claim 16, wherein Said First Voice Traffic Path is established by using Voice Communication Network and Mobile Communication Circuit Network, Said First Caption Traffic Path is established by using Internet Protocol Data Network and Mobile Communication Circuit Network, Said Second Voice Traffic Path and said Third Voice Traffic Path are established by using Voice Communication Network, and Said Second Caption Traffic Path is established by using Internet Protocol Data Network.

22. The method of claim 21, wherein Said First Caption Traffic Path is established by using Internet Protocol Data Network and USSD (Unstructured Supplementary Service Data) of said Mobile Communication Circuit Network.

23. A method to provide caption telephone service executed in WCTS terminal, comprising steps of:
a) receiving the other user's voice data or responding to the other user's terminal and caption data produced from the other user's voice data from WCTS Server System; and
b) outputting said other user's voice data and said caption data received;
wherein Said WCTS Server System receives the other user's voice data from the other user's terminal through a previously established Second Voice Traffic Path, transfers said other user's voice data to a Relay Center through a previously established Third Caption Traffic Path, receives said caption data produced from said other user's voice data from said Relay Center through a previously established Second Caption Traffic Path and transfers to said WCTS terminal said other user's voice data through a previously established First Voice Traffic Path and said caption data through a previously established First Caption Traffic Path;
wherein a WCTS Terminal that is combined with the WCTS Server System providing Caption Telephone Service, comprises:

i) a dialing part;
ii) an operation system part;
c) a communication module part;
d) a monitoring part; and
e) a WCTS application part;
wherein the dialing part is linked to the communication module part by using the operation system part and operates when an user calls or receives calls, wherein the state of communication of the communication module part and events produced by the dialing Part during receiving or transferring calls are transferred to the monitoring part through the operation system part, wherein the monitoring part executes the start and end of WCTS application part by using the events, wherein the WCTS application part comprises an application program for the reception of WCTS service, which is executed by the monitoring part, wherein after the WCTS application part is executed, the WCTS application part is connected to the WCTS server system by using the communication module part through the operation system part, and receives and transmits voice data or caption data literated from voice data;
wherein in a process of treating outgoing call from the monitoring Part, the monitoring Part stands by on an initial stage and receives events, wherein after determining types of received events if the event is an outgoing call event, the monitoring part determines whether the WCTS terminal is set up to receive voice data by a circuit network after executing the WCTS application part;
wherein if receipt or transmission of call is not necessary, the monitoring part ends a circuit call, wherein if receipt or transmission of call is necessary, the monitoring part completes the process and stands by on the initial stage, wherein even if a circuit call is set to be used in the outgoing call process, the monitoring part ends the circuit call;
wherein if the received event on the initial stage is incoming call event and incoming caller's number is same as the number of WCTS Server System, the monitoring part automatically answers the call and automatically link with the Voice Traffic Path without ringing and then completes the process after determining whether the circuit call will be used, wherein if incoming caller's number is not WCTS Sever System's number, the monitoring part determines that the call is received from the other user's terminal and then delivers vibration or light or sound ring signal to the user of the WCTS terminal, wherein during the ringing process, if user of the WCTS terminal user refuses to answer the monitoring part completes the process, wherein if the user of the WCTS terminal answers the phone, the monitoring part executes the WCTS Application Part, and then, after determining whether the circuit call should be used, ends the process;

wherein when the WCTS application part is initiated by the monitoring part, the WCTS application part attempts to link with the WCTS server system by using previously saved information of the WCTS server system, wherein after the completion of linking, the WCTS application part stands by on a stage of receiving message, wherein if a received message is one instructing the user to indicate UI, the WCTS Application Part displays on a screen Display Part that will show received message and UI of a User Entry Part including input window, wherein if the received message is the caption letter data from the other user's voice data, the WCTS application part outputs the data on the Display Part, wherein if the received message are letters entered from the User Entry Part, the WCTS application part transfers the message to the WCTS server system, wherein if the received message is the WCTS Application Part's end order, the WCTS application part stands by on the stage of receiving process after ending the process.

24. The method of claim 23, wherein Said receiving step and said outputting step are executed by execution of WCTS Application Part by the control of Monitoring Part that monitors communication event in order to link with said WCTS Server System.

25. The method of claim 23, wherein Said First Voice Traffic Path is established by using Voice Communication Network and Mobile Communication Circuit Network, Said First Caption Traffic Path is established by using Internet Protocol Data Network and said Mobile Communication Packet Network, and Said First Voice Traffic Path and said First Caption Traffic Path are separated from each other.

26. The method of claim 25, wherein Said Second Voice Traffic Path and said Third Voice Traffic Path are established by using said voice communication network and Said Second Caption Data Traffic is established by using said Internet Protocol Data Network.

27. The method of claim 23, wherein Said First Voice Traffic Path and said First Caption Traffic Path are established by using Internet Protocol Data Network and Mobile Communication Packet Network, and Said First Voice Traffic Path and said First Caption Traffic Path are the same.

28. The method of claim 27, wherein Said Second Voice Traffic Path and said Third Voice Traffic Path are established by using Voice Communication Network, and Said Second Caption Traffic Path is established by using said Internet Protocol Data Network.

29. The method of claim 23, wherein Said First Voice Traffic Path is established by using Voice Communication Network and Mobile Communication Circuit Network, Said First Caption Traffic Path is established by using Internet Protocol Data Network and Mobile Communication Circuit Network, Said Second Voice Traffic Path and said Third Voice Traffic Path are established by using Voice Communication Network, and Said Second Caption Traffic Path is established by using Internet Protocol Data Network.

30. The method of claim 29, wherein Said First Caption Traffic Path is established by using Internet Protocol Data Network and USSD (Unstructured Supplementary Service Data) of said Mobile Communication Circuit Network.

* * * * *